UNITED STATES PATENT OFFICE.

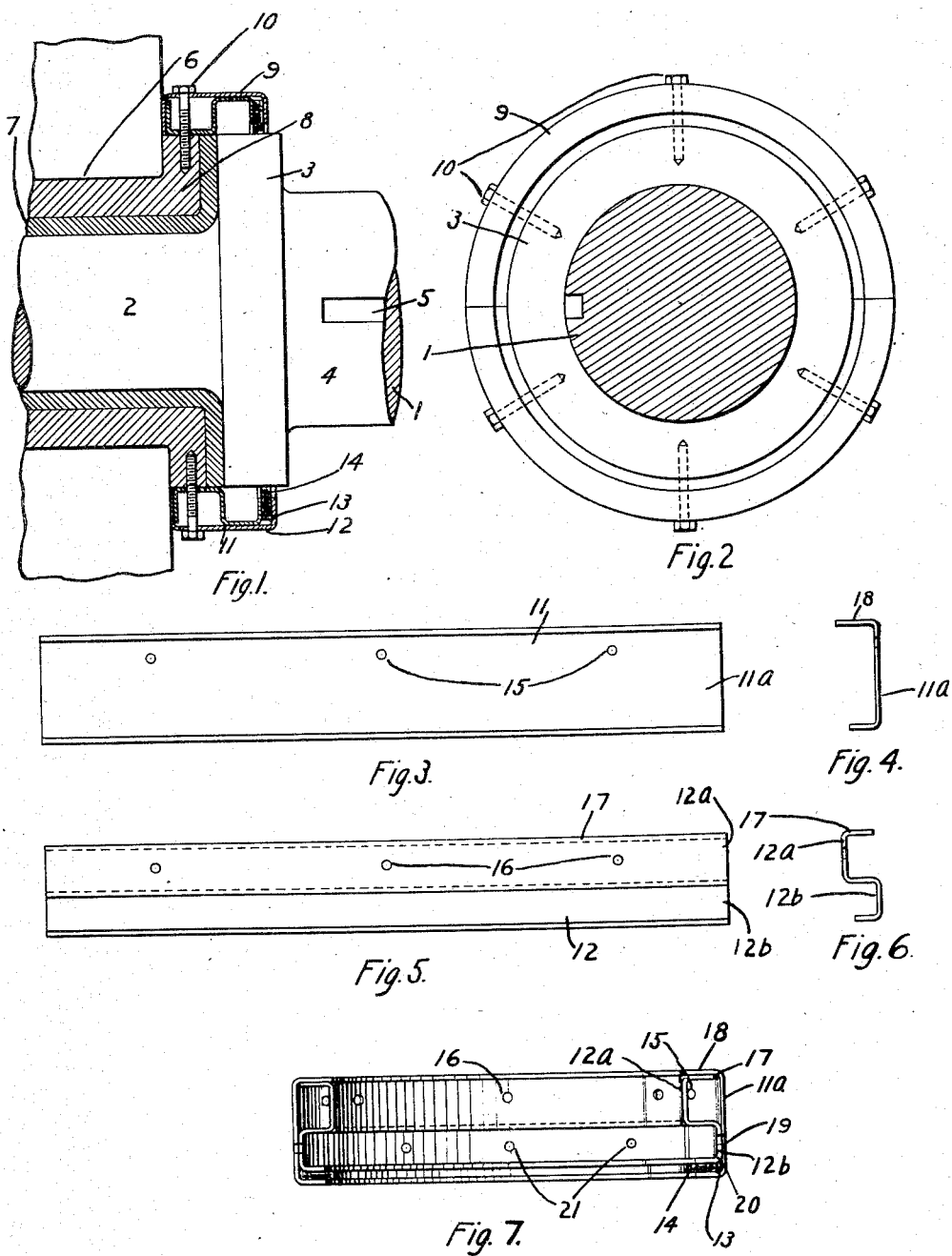

ALEXIS R. PRIBIL, OF CLEVELAND, OHIO, ASSIGNOR TO WESTINGHOUSE ELECTRIC & MANUFACTURING COMPANY, A CORPORATION OF PENNSYLVANIA.

GUARD FOR ROTATABLY-MOUNTED MEMBERS.

1,300,294.   Specification of Letters Patent.   Patented Apr. 15, 1919.

Application filed July 19, 1917. Serial No. 181,525.

*To all whom it may concern:*

Be it known that I, ALEXIS R. PRIBIL, a citizen of the United States, and a resident of Cleveland, in the county of Cuyahoga and State of Ohio, have invented a new and useful Improvement in Guards for Rotatably-Mounted Members, of which the following is a specification.

My invention relates to guards for rotatably mounted members, such, for example, as the driving wheel axles that are used in connection with electric railway motors and it has for its object to provide a guard that is particularly simple and inexpensive in construction.

In the copending application of Chas. W. Starker, Serial No. 50,084, filed Sept. 10, 1915, and assigned to the Westinghouse Electric & Manufacturing Company is shown and described an axle bearing comprising a flanged cylindrical shell to which is secured a guard for the purpose of excluding foreign matter from the bearing surfaces. The guard shown therein specifically comprises annular plates between which is secured a layer of absorbent material, the guard, as a whole, being secured to the flange of the bearing shell by suitable brackets. Such guards are relatively expensive to construct and to assemble upon the bearing sleeve.

By my invention, I provide an axle guard, the component parts of which are cheaply and readily formed of pressed metal and are so designed that they may be readily applied to bearing shells of the type shown in the above-mentioned copending application.

In the accompanying drawing, Figure 1 is a transverse sectional view of a portion of an axle bearing embodying my invention; Fig. 2 is an end elevation of the parts shown in Fig. 1; Figs 3 to 6 are detailed views showing the pressed metal members of the axle guard before being assembled and Fig. 7 is a detail view of the members of the axle guard after being assembled.

An axle 1 is provided with a journal portion 2, a collar 3 of somewhat greater diameter than the journal 2 and a wheel seat 4 provided with a key-way 5 by means of which a suitable vehicle wheel may be mounted on the axle. The journal portion 2 is rotatably mounted in a bearing that comprises a cylindrical shell 6 that is provided with an inner lining 7 of bearing metal. The shell 6 is provided with an annular end flange 8 to which is secured a dust guard 9 by means of bolts 10.

The axle guard 9 comprises nesting trough-shaped annular members 11 and 12 which are secured together with their adjacent inner side walls spaced apart to provide an annular recess 13. A ring 14 of suitable absorbent material, such as felt, is located within the recess 13 and fits closely around the collar 3 of the axle 1 to prevent the entrance of any dust or dirt into the adjacent bearing surfaces.

Referring now to Figs. 3 and 4, the guard member 11 is pressed from a strip of metal to form a trough, the bottom portion $11^a$ of which is provided with a plurality of spaced openings 15. The guard member 12 is also pressed from a sheet of metal to form a double trough that is open on opposite sides and is of less width than the member 11. A plurality of openings 16 are provided in one bottom portion $12^a$ of the member 12 and are spaced apart the same distance as the openings 15. The trough-shaped members 11 and 12 are then bent about a suitable mandrel into annular form as best shown in Fig. 2. The member 12 is then placed within the member 11 with its outer side wall portion 17 in engagement with the bottom portion $11^a$ and with the outer side wall portion 18 of the member 11, thereby maintaining the adjacent inner wall portions 19 and 20 in concentric relation, as best shown in Fig. 7. In this position, the holes 16 of the member 12 register with the holes 15 of the member 11. The ring 14 is then slightly compressed and placed within the annular groove 13 between the wall portions 19 and 20, after which the engaging bottom portions $11^a$ and $12^b$ of the members 11 and 12, respectively, are secured together by welding or other suitable means, as indicated at 21. The completed axle guard 9 thus comprises a tubular annular portion which is secured to the flange 8 of the bearing sleeve 6 by the bolts 10, it being noted that the side wall portion 17 engages the bottom portion $11^a$ and prevents collapse of the tubular portion under the compression of the bolts 10.

While I have shown my invention in its simplest and preferred form and as applied to a particular type of axle bearing, it will be readily understood that it may as readily be used for other similar purposes and I, therefore, desire that only such limitations shall be imposed thereon as come within the scope of the appended claims.

I claim as my invention:

1. A guard for a rotatably mounted member comprising nesting trough-shaped members having their side walls spaced apart and a layer of absorbent material located between adjacent walls of said members.

2. A guard for a rotatably mounted member comprising nesting trough-shaped members of different widths having their adjacent side walls spaced apart and a layer of absorbent material located in the space between the adjacent walls of said members.

3. An axle guard comprising nesting trough-shaped members of different widths and embodying an element carried by one of the members, for spacing apart the adjacent side walls of said members and a layer of absorbent material located in the space between the adjacent walls of said members.

4. An axle guard comprising nesting trough-shaped members of different widths, one of said members being provided with a reverse trough portion for fixing the relative spacing of said members, and a layer of absorbent material located in the space between the adjacent walls of said members.

5. An axle guard comprising nesting trough-shaped members secured together at points along their engaging base portions and having their side walls spaced apart.

6. A guard for a rotatably mounted member comprising nesting trough-shaped members having their engaging base portions secured together and their adjacent side walls spaced apart.

7. An axle guard comprising trough-shaped pressed metal strips bent into annular form and secured together in nesting relation.

8. An axle guard comprising trough-shaped pressed metal strips bent into annular form and secured together in nesting relation and a layer of absorbent material located between adjacent side wall portions of said strips.

9. An axle guard comprising trough-shaped pressed metal strips bent into annular form and secured together in nesting relation with their side wall portions concentrically arranged and spaced apart.

10. An axle guard comprising trough-shaped pressed metal strips bent into annular form and secured together in nesting relation with their side wall portions concentrically arranged and adjacent wall portions spaced apart and a layer of absorbent material located in the space between the adjacent side wall portions of said strips.

11. An axle guard comprising trough-shaped pressed metal strips bent into annular form and having their engaging base portions secured together and their side wall portions spaced apart and a layer of absorbent material located in the space between the adjacent side-wall portions of said strips.

12. An axle guard comprising a single trough-shaped member and a double trough-shaped member, the said members being arranged in nesting relation to form a closed tubular portion and an open slot between adjacent wall portions of said members.

13. An axle guard comprising a single trough-shaped pressed metal strip and a double trough-shaped pressed metal strip, the said strips being bent into annular form and arranged in nesting relation to form a self-sustaining tubular annular portion.

14. An axle guard comprising a single trough-shaped pressed metal strip and a double trough-shaped pressed metal strip, the said strips being bent into annular form and arranged in nesting relation to form a self-sustaining tubular annular portion and an open annular groove and a layer of absorbent material located in said groove.

15. In a bearing, the combination with a cylindrical bearing sleeve, of a guard member comprising trough-shaped annular portions arranged in nesting relation to form a self-sustaining tubular portion surrounding said sleeve and members passing through said tubular portion for securing said guard to said sleeve.

In testimony whereof, I have hereunto subscribed my name this 29th day of June 1917.

ALEXIS R. PRIBIL.